United States Patent
Rival et al.

(10) Patent No.: US 8,624,762 B2
(45) Date of Patent: Jan. 7, 2014

(54) VARIABLE BITRATE EQUIPMENT

(75) Inventors: Olivier Rival, Nozay (FR); Annalisa Morea, Nozay (FR)

(73) Assignee: Alcatel Lucent, Paris (FR)

( * ) Notice: Subject to any disclaimer, the term of this patent is extended or adjusted under 35 U.S.C. 154(b) by 30 days.

(21) Appl. No.: 13/319,236

(22) PCT Filed: Mar. 3, 2010

(86) PCT No.: PCT/EP2010/052664
§ 371 (c)(1),
(2), (4) Date: Jan. 17, 2012

(87) PCT Pub. No.: WO2010/142472
PCT Pub. Date: Dec. 16, 2010

(65) Prior Publication Data
US 2012/0249347 A1 Oct. 4, 2012

(30) Foreign Application Priority Data
Jun. 12, 2009 (EP) .................................. 09290441

(51) Int. Cl.
*H03M 7/20* (2006.01)

(52) U.S. Cl.
USPC .......................................... 341/101; 341/100

(58) Field of Classification Search
USPC ................................................ 341/100, 101
See application file for complete search history.

(56) References Cited

U.S. PATENT DOCUMENTS

| | | | |
|---|---|---|---|
| 4,429,383 A | 1/1984 | Finck et al. | |
| 4,685,101 A * | 8/1987 | Segal et al. | 370/468 |
| 6,507,611 B1 * | 1/2003 | Imai et al. | 375/222 |
| 6,546,013 B1 * | 4/2003 | Huang et al. | 370/395.1 |
| 6,631,144 B1 * | 10/2003 | Johansen | 370/516 |
| 6,930,623 B2 * | 8/2005 | Iio et al. | 341/100 |
| 7,082,144 B1 * | 7/2006 | Grutter | 370/535 |
| 7,342,520 B1 * | 3/2008 | Katzman et al. | 341/100 |
| 7,366,267 B1 * | 4/2008 | Lee et al. | 375/354 |
| 7,528,748 B2 * | 5/2009 | Ohara | 341/101 |
| 7,817,068 B2 * | 10/2010 | Ghoneima et al. | 341/55 |
| 7,986,878 B2 * | 7/2011 | Saunders et al. | 398/26 |
| 8,188,894 B2 * | 5/2012 | Chin et al. | 341/100 |
| 8,415,984 B2 * | 4/2013 | Yamase et al. | 327/94 |
| 2004/0178935 A1 * | 9/2004 | Iio et al. | 341/100 |
| 2008/0298810 A1 * | 12/2008 | Crosby et al. | 398/135 |
| 2009/0180494 A1 * | 7/2009 | Ren et al. | 370/476 |
| 2012/0275783 A1 * | 11/2012 | Kitajima et al. | 398/27 |

FOREIGN PATENT DOCUMENTS

| | | |
|---|---|---|
| DE | 19536025 | 2/1997 |
| WO | 00/27060 | 5/2000 |
| WO | 00/44175 | 7/2000 |

* cited by examiner

*Primary Examiner* — Linh Nguyen
(74) *Attorney, Agent, or Firm* — Carmen Patti Law Group, LLC

(57) ABSTRACT

The present invention refers to a signal concentrator comprising:
 a parallel to serial conversion device comprising a plurality of parallel inputs and a serial output,
 a control unit comprising detection means adapted for detecting the activity of said plurality of parallel inputs of said parallel to serial conversion device, indication means adapted for indicating the active parallel inputs to the parallel to serial conversion device and controlling means adapted for setting an operating bitrate of the serial output in function of said activity of said plurality of parallel inputs.

13 Claims, 4 Drawing Sheets

VARIABLE BITRATE EQUIPMENT

BACKGROUND OF THE INVENTION

The present invention relates to the field of communication networks and in particular to dynamic networks with bitrate agility.

Current communication networks comprises different types of transmission links having different bitrates. Thus, in order to reduce transmission costs while providing enhanced services, an idea is to aggregate a plurality of low bitrate data streams into a high bitrate data stream for high speed communications.

In the state of the art, concentrators allowing to aggregate several signals are known but the bitrate of the output transmission link is always the same whatever the number of received signals. Indeed, in case of inactive inputs, bit padding is achieved in order to compensate for the missing signal. Thus, useless signals are transmitted which maximizes the required amount of energy and may lead to a reduced signal quality.

Besides, another solution for adapting the bitrate of the output port of a concentrator is to modify the Internet Protocol (IP) router so that it can deliver variable bitrates. However, such solution requires significant and expensive modifications and may lead to compatibility issues with existing routers.

SUMMARY OF THE INVENTION

It is therefore an object of the present invention to overcome the above cited drawbacks of the state of the art and provide a method allowing to aggregate a variable number of input low bitrate signals into an output signal with a variable high bitrate without requiring important modifications in the network design.

Thus, the present invention refers to a signal concentrator comprising:
- a parallel to serial conversion device comprising a plurality of parallel inputs and a serial output,
- a control unit comprising detection means adapted for detecting the activity of said plurality of parallel inputs of said parallel to serial conversion device, indication means adapted for indicating the active parallel inputs to the parallel to serial conversion device and controlling means adapted for setting an operating bitrate of the serial output in function of said activity of said plurality of parallel inputs.

According to another embodiment, the controlling means comprise a clock signal generator for generating a clock signal in function of the activity of said plurality of parallel inputs, said clock signal allowing the setting of the operating bitrate.

According to a further embodiment, the plurality of parallel inputs of the parallel to serial conversion device are coupled to a plurality of fixed bitrate transmission lines and the activity detection of a parallel input comprises the detection of a received data signal at said parallel input.

According to an additional embodiment, the transmission lines have the same bitrate.

According to another embodiment, the operating bitrate of the serial output is determined by detecting the number of active parallel inputs.

According to a further embodiment, the signals received by the parallel inputs have different bitrates and the control unit comprises determination means adapted to determine the bitrate of the received signals.

According to an additional embodiment, the clock signal corresponds to the sum of the clock rates of the active parallel inputs.

According to another embodiment, the parallel to serial conversion device comprises a First In First Out (FIFO) queue, the active parallel inputs are sequentially scanned and a predetermined number of bits of the signals received on said active parallel inputs is transmitted to the FIFO queue the output of which corresponds to the output of the parallel to serial conversion device.

According to a further embodiment, the predetermined number of bits is equal to one.

According to an additional embodiment, the predetermined number of bits corresponds to a byte.

According to another embodiment, the predetermined number of bits corresponds to a frame.

The present invention also refers to an optical transmission system comprising:
- a signal concentrator,
- a variable bitrate optical transponder coupled to the serial output of the parallel to serial conversion device.

The present invention also refers to a signal distributor comprising:
- a serial to parallel conversion device comprising a serial input and a plurality of parallel outputs,
- a control unit comprising detection means adapted for detecting the number of independent data signal comprised in the signal received at the serial input and the organization of said signals and controlling means adapted for distributing the signal received at the serial input towards said plurality of parallel inputs.

The present invention also refers to an optical reception system comprising:
- a signal distributor,
- a variable bitrate optical transponder coupled to the serial input of the parallel to serial conversion device.

DETAILED DESCRIPTION OF THE INVENTION

Figure 1:
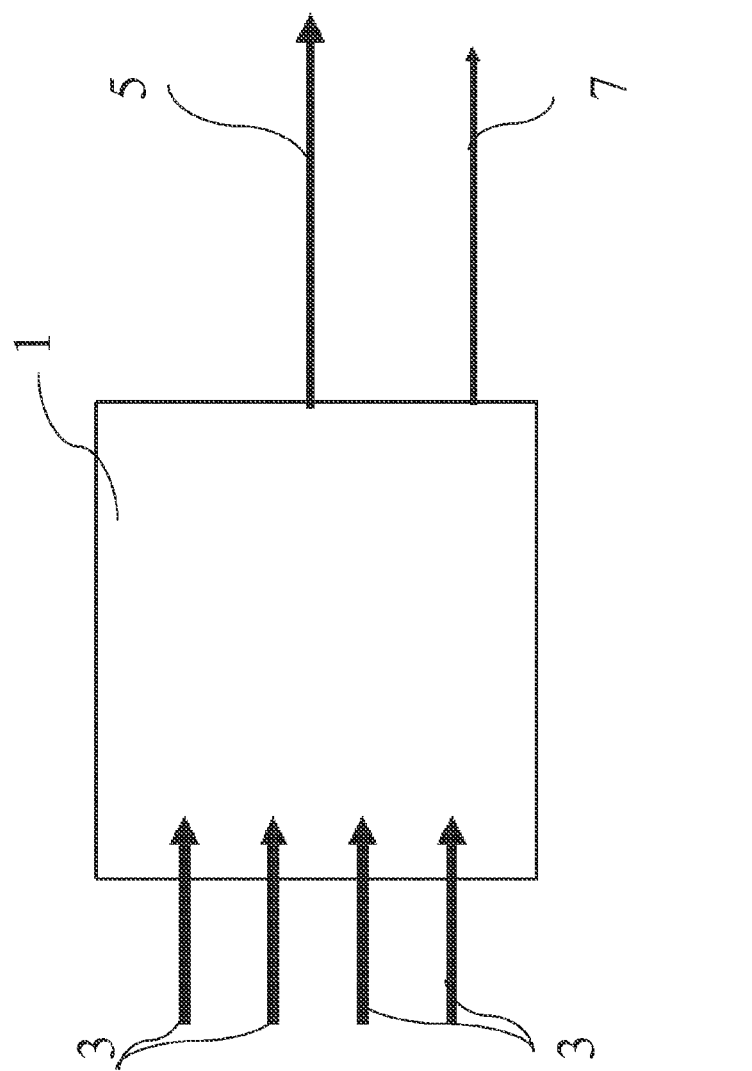
FIG. 1 is a diagram representing a concentrator.
Figure 2:
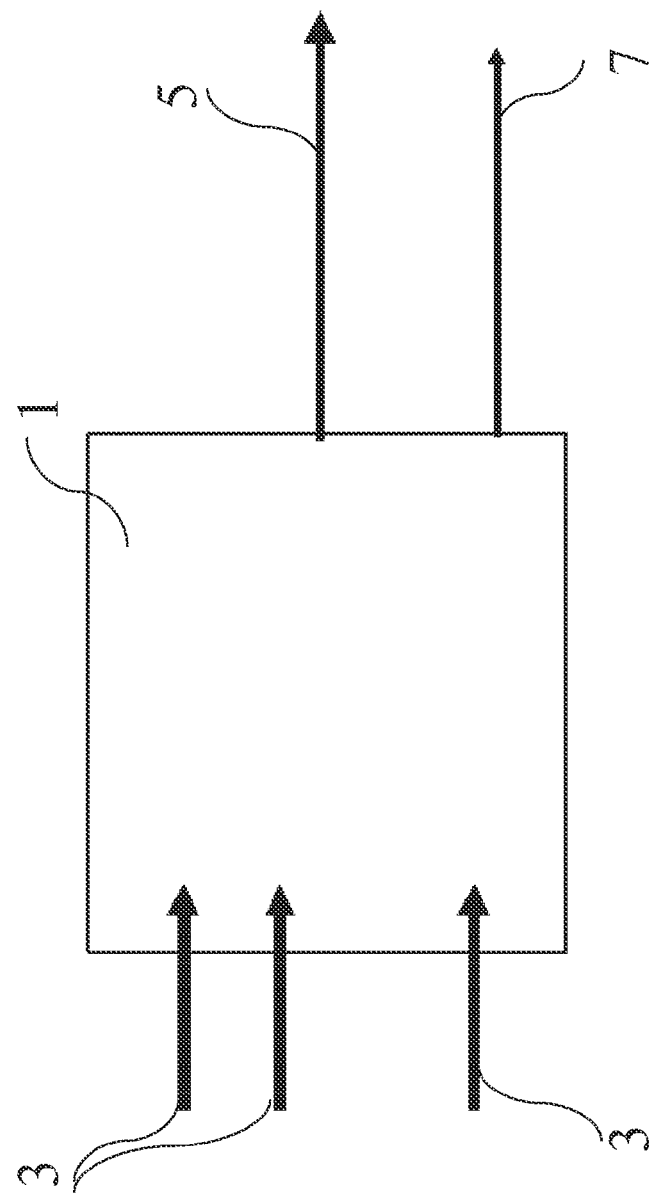
FIG. 2 is a diagram representing a concentrator with an inactive input.

As used herein, the term "active input" refers to an input receiving data signals;
As used herein, the term "Gb/s" refers to the unit gigabit per second;
As used herein, the term "GHz" refers to the unit gigahertz;
An embodiment of the present invention refers to a concentrator or transmission system 1 as described in FIG. 1 allowing to aggregate the signals received on a plurality of parallel input channels 3 onto a serial output channel 5 having a bitrate equal to the sum of the bitrates of the input channels 3. In FIG. 1, the transmission system comprises four input channels 3 having each a 10 Gb/s bitrate such that the output channel 5 has a 40 Gb/s bitrate. Moreover, a clock signal 7 corresponding to the bitrate of the output channel (40 GHz in the present case) is provided. Besides, if only three of the input channels 3 are active as represented in FIG. 2, the bitrate of the output channel 5 becomes 30 Gb/s corresponding to a clock signal 7 of 30 GHz. In addition, an adaptation of the bitrate to the actual needs allows to save energy and to improve the signal quality when the bit rate is reduced.

Figure 3:
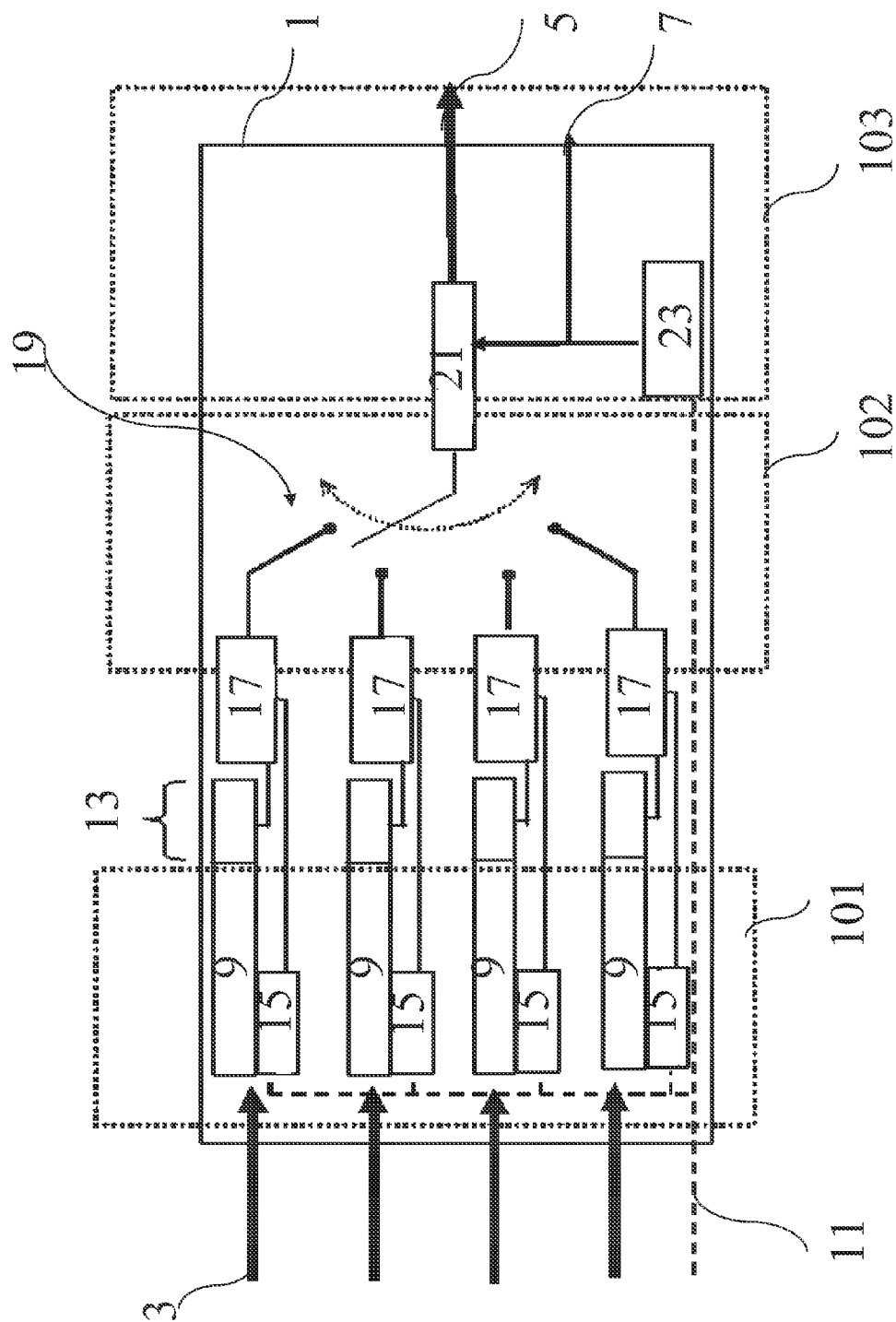
FIG. 3 is a diagram representing a possible embodiment of a concentrator according to the invention.

FIG. 3 represents a possible embodiment of a transmission system 1 according to the present invention. Said transmission system 1 comprises four input channels 3, also called tributaries, having each a bit rate of 10 Gb/s.

It has to be noted that the value of 10 Gb/s and the number of four input channels 3 are given as examples (because of the general use of 10 and 40 Gb/s transmission links in the current communication networks) but any value may be used in the scope of the present invention.

Said tributaries 3 are connected to parallel First In First Out (FIFO) inputs 9. An additional control data channel 11 provides the status (active or idle) of the input channels 3. Said control data channel 11 is connected to the activity detection means 15 of each FIFO inputs 9. In the first section 101 of the transmission system 1, the data of the active streams transmitted on the input channels 3 are received in the corresponding queues of the FIFO inputs 9. Then, a predetermined number of bits 13, corresponding to the slot size, of each active FIFO queue is copied to the corresponding input 17 of a switch 19 at a clock rate of 10 GHz.

Said predetermined number of bits 13 depends on the configuration chosen and allow to select the optimal trade-off between buffer size (queue length) and clock frequency. It can be, for example, a bit per bit, a byte per byte or a frame per frame selection.

In section 102, the switch 19 scans sequentially the selected predetermined number of bits of each active input 17 and write said bits in an output FIFO queue 21. The scanning rate is equal to (40/n) GHz where n is the predetermined number of bits 13.

Besides, the control data channel 11 is also connected to a frequency generator 23. Thus, at step 103, the frequency generator 23 generates a clock signal 7 corresponding to the actual total bitrate, for example, in the present example with four active input streams of 10 Gb/s, the generated clock signal is 4*10 GHz, that is to say 40 GHz.

The data of the output FIFO queue 21 are therefore read out, multiplexed and transmitted to the output channel 5 at a 40 Gb/s bitrate.

If one of the input channels 3 becomes inactive, as it is the case in FIG. 2, the information of such inactivity (idle status) is brought by the control data channel to the transmission system 1. As a consequence, the switch 21 will only scan the three remaining active inputs 17 and the frequency generator 23 will generate a clock signal of 30 GHz such that the data of the output FIFO queue 21 will be read out and transmitted to the output channel 5 at a 30 Gb/s bitrate.

Besides, in the case of an optical network, a variable bitrate optical transponder may be coupled to the output channel 5 in order to convert the electronic signal into a corresponding optical signal having the same bitrate. Thus, the bitrate of the transmitted optical signal varies in function of the amount of data needed to be transmitted through the optical network.

After transmission through the communication network, the signal is received at the egress node. In the case of an optical transmission network, the signal is converted to an electronic signal thanks to an optical transponder located at the input of the egress node.

Figure 4:
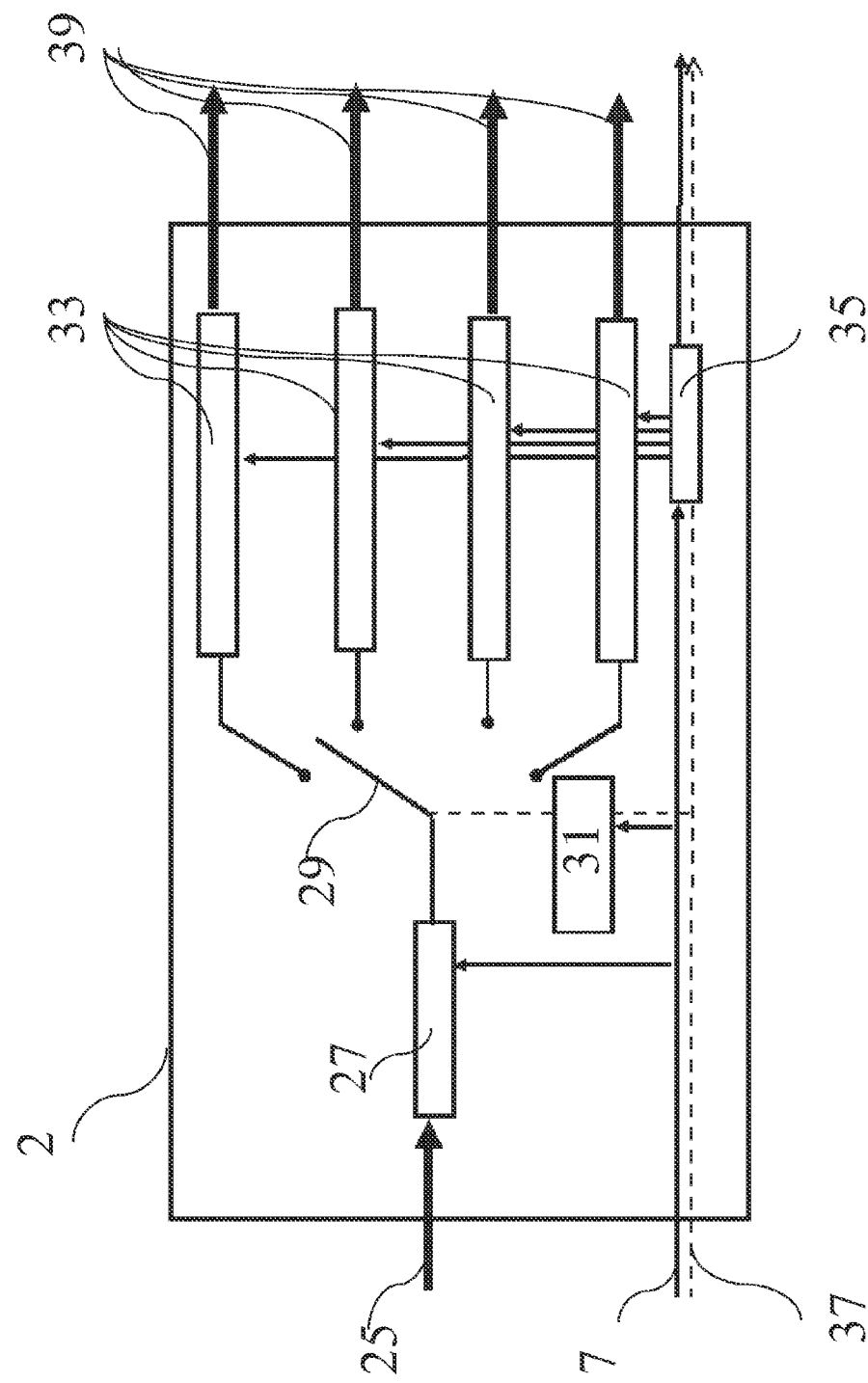
FIG. 4 is a diagram representing a possible embodiment of a receiver according to the invention.

FIG. 4 represents a possible embodiment of a distributor or reception system 2. The operation achieved by said reception system 2 corresponds to the converse operation with respect to the transmission system 1 presented in FIG. 3. The transmitted signal is received on a FIFO input 27 through an input channel 25. The clock signal 7 is also transmitted and received at the reception system 2. Said clock signal 7 is transmitted to the FIFO input 27 in order to allow said input to process the received data. In addition, a control data channel 37 comprising information required for demultiplexing the received signals is connected to the reception system 2. Said information comprises, for example, the total bitrate, the number of active input channels and the slot size (number of bits used for the multiplexing). Based on this information and using the clock signal 7, a switch controller 31 manages the position of the switch 29 in order to distribute the signal among the FIFO outputs 33. A clock signal (for example of 10 GHz) generated by a clock generator 35 is distributed to the different FIFO outputs 33 in order to transmit the demultiplexed signals at the required bitrate (for example 10 Gb/s) to the output channels 39.

Based on the previous example, if the received signal has a bitrate of 40 Gb/s and is composed of four active input channels which have a slot size of one byte, then the switch controller 31 will send the first received byte to the first FIFO output 33, the second byte to the second FIFO output 33 and so on sequentially such that the four initial signals received at the four input channels 3 of the transmission system 1 will be recreated at the FIFO outputs 33. In the case described in FIG. 2, the signal received on the input channel 25 has a bitrate of 30 Gb/s and is composed of three active input channels. Said information is transmitted through the control data channel 37 and in the same way, the three signals will be recreated at the three corresponding output channels 39.

According to another embodiment, the signals received on the different input channels 3 have different bitrates (for example 10 Gb/s for the first two input channels and 5 Gb/s for the two following input channels) or different format corresponding to slightly different bitrates. In such situation, the position of the switch 19 will be monitored in order to take into account the different bitrates such that the time spent by the switch in a position corresponds to the time required in function of the bitrate of the corresponding input channel 3. Moreover, additional data (such as the individual bitrates) will be added in the control data signal 37 in order to allow the switch controller 31 and the switch 29 to correctly demultiplex the received signal. Besides, the clock generator 35 will have to generate individual clock signal for each signal in order to recreate the initial signal at the FIFO outputs 33. Thus with two input channels of 10 Gb/s and two channels of 5 Gb/s, when all the input channels 3 are active, the operating bitrate of the output channel 5 is 30 Gb/s and comprises four tributaries. The control data channel will then transmit said information to the reception system 2 in order to recreate the four signals with two signals having a 10 Gb/s bitrate and two signals having a 5 Gb/s bitrate at the output channels 39.

As a conclusion, the embodiments of the present invention allow to adapt the bitrate of transmitted signals in function of the number of active input channel signals. Such bitrate agility reduces the power consumption, allows adaptation of the network to the customers needs and eases the upgrade of the current networks to improved capacities. Moreover, the reduction of the bitrate of the transmitted signal reduces signal impairments and therefore leads to a better signal quality.

The invention claimed is:

1. A signal concentrator comprising:
a parallel to serial conversion device comprising a plurality of parallel inputs and a serial output; and
a control unit comprising a detection means adapted to detect an activity of said plurality of parallel inputs of said parallel to serial conversion device, an indication means adapted to indicate the active parallel inputs to the parallel to serial conversion device and a controlling means adapted to set an operating bit rate of the serial output as a function of said activity of said plurality of parallel inputs, said controlling means comprising a clock signal generator configured to generate a clock signal as a function of the activity of said plurality of parallel inputs, said clock signal allowing a setting of the operating bit rate.

2. The signal concentrator in accordance with claim 1, wherein the plurality of parallel inputs of the parallel to serial conversion device are coupled to a plurality of fixed bit rate transmission lines, and wherein the activity detection of a parallel input comprises the detection of a received data signal at said parallel input.

3. The signal concentrator in accordance with claim 2, wherein the transmission lines have the same bit rate.

4. The signal concentrator in accordance with claim 3, wherein the operating bit rate of the serial output is determined by detecting the number of active parallel inputs.

5. The signal concentrator in accordance with claim 1, wherein the signals received by the parallel inputs have different bit rates, and wherein the control unit comprises a determination means adapted to determine the bit rate of the received signals.

6. The signal concentrator in accordance with claim 1, wherein the clock signal corresponds to a sum of the clock rates of the active parallel inputs.

7. The signal concentrator in accordance with claim 1, wherein the parallel to serial conversion device comprises a First In First Out (FIFO) queue, and wherein the active parallel inputs are sequentially scanned and a predetermined number of bits of the signals received on said active parallel inputs is transmitted to the FIFO queue, the output of which corresponds to the output of the parallel to serial conversion device.

8. The signal concentrator in accordance with claim 7, wherein the predetermined number of bits is equal to one.

9. The signal concentrator in accordance with claim 7, wherein the predetermined number of bits corresponds to a byte.

10. The signal concentrator in accordance with claim 7, wherein the predetermined number of bits corresponds to a frame.

11. An optical transmission system comprising:
a signal concentrator according to claim 1; and
a variable bit rate optical transponder coupled to the serial output of the parallel to serial conversion device.

12. A signal distributor comprising:
a serial to parallel conversion device comprising a serial input and a plurality of parallel outputs; and
a control unit comprising a detection means adapted to detect a number of independent data signals comprised in the signal received at the serial input and an organization of said signals and a controlling means adapted to distribute the signal received at the serial input towards said plurality of parallel outputs.

13. An optical reception system comprising:
a serial to parallel conversion device comprising a serial input and a plurality of parallel outputs;
a control unit comprising a detection means adapted to detect a number of independent data signals comprised in the signal received at the serial input and an organization of said signals and a controlling means adapted to distribute the signal received at the serial input towards said plurality of parallel outputs;
and
a variable bit rate optical transponder coupled to the serial input of the serial to parallel conversion device.

* * * * *